United States Patent
Marauska et al.

(10) Patent No.: US 10,914,609 B2
(45) Date of Patent: Feb. 9, 2021

(54) SYSTEM AND METHOD FOR ANGLE SENSING USING MAGNET HAVING ASYMMETRIC MAGNETIZATION CONFIGURATION

(71) Applicant: NXP B.V., Eindhoven (NL)

(72) Inventors: Stephan Marauska, Kaltenkirchen (DE); Edwin Schapendonk, Oss (NL); Dennis Helmboldt, Halstenbek (DE); Jaap Ruigrok, Asten (NL); Ralf van Otten, Eindhoven (NL); Jan Przytarski, Hamburg (DE); Jörg Kock, Horst (DE)

(73) Assignee: NXP B.V., Eindhoven (NL)

( * ) Notice: Subject to any disclaimer, the term of this patent is extended or adjusted under 35 U.S.C. 154(b) by 269 days.

(21) Appl. No.: 16/011,974

(22) Filed: Jun. 19, 2018

(65) Prior Publication Data

US 2019/0383644 A1 Dec. 19, 2019

(51) Int. Cl.
*G01D 5/14* (2006.01)
*G01B 7/30* (2006.01)

(52) U.S. Cl.
CPC .............. *G01D 5/145* (2013.01); *G01B 7/30* (2013.01)

(58) Field of Classification Search
CPC ........ G01D 5/145; G01D 5/20; G01D 5/2013; G01B 7/30; G01B 2290/55; G01B 9/02
USPC ... 324/200, 207.13, 219–252, 207.2–207.24, 324/500, 529–530, 750.12, 750.21, 324/754.17, 754.29
See application file for complete search history.

(56) References Cited

U.S. PATENT DOCUMENTS

| | | | |
|---|---|---|---|
| 9,605,978 | B2 | 3/2017 | Ausserlechner et al. |
| 2012/0223699 | A1 | 9/2012 | Holman, Jr. et al. |
| 2012/0326713 | A1 | 12/2012 | Zimmer et al. |
| 2015/0137796 | A1* | 5/2015 | Ausserlechner ....... G01D 5/142 324/207.2 |
| 2015/0168124 | A1 | 6/2015 | Bondar |
| 2016/0069710 | A1 | 3/2016 | Ausserlechner |
| 2018/0135961 | A1* | 5/2018 | Vandersteegen ......... G01B 7/30 |

FOREIGN PATENT DOCUMENTS

| | | |
|---|---|---|
| DE | 103 06 127 A1 | 9/2004 |
| EP | 2543975 A1 | 1/2013 |
| WO | WO-01/55668 A1 | 8/2001 |
| WO | WO-2017078665 A1 | 5/2017 |

* cited by examiner

*Primary Examiner* — Melissa J Koval
*Assistant Examiner* — Trung Nguyen
(74) *Attorney, Agent, or Firm* — Charlene R. Jacobsen

(57) ABSTRACT

A system includes a magnet configured to produce a magnetic field, the magnet having an asymmetric magnetization configuration that produces a distinct feature in the magnetic field. The asymmetric magnetization configuration can be produced via an asymmetric physical characteristic, nonuniform magnetization strengths, nonuniform magnetization distributions, off-centered magnet, and so forth. Magnetic field sensors are configured to produce output signals in response to the magnetic field, the output signals being indicative of the distinct feature in the magnetic field. A processing circuit receives the output signals and determines a rotation angle for the magnet using the output signals, the rotation angle having a range of 0-360°.

12 Claims, 11 Drawing Sheets

30

32

32

34

US 10,914,609 B2

SYSTEM AND METHOD FOR ANGLE SENSING USING MAGNET HAVING ASYMMETRIC MAGNETIZATION CONFIGURATION

TECHNICAL FIELD OF THE INVENTION

The present invention relates generally to magnetic field sensors. More specifically, the present invention relates to systems incorporating the magnetic field sensors for measuring angular position over 360° using magnets having an asymmetric magnetization configuration.

BACKGROUND OF THE INVENTION

Angular sensors, for measuring a rotation angle or angular position, are implemented in a wide array of automotive and industrial applications. For example, in the automotive industry, angular sensors may be used for valve control, pedal position sensing, steering wheel position sensing, throttle position sensing, motor-shaft position sensing, and multiple other uses. Typically, magnetic field sensors are preferred because their contactless measurement makes them immune to mechanical wear. In these applications, a change in the direction of the magnetic field of a magnet mounted on the moving part, is measured. The magnetic field is not hindered by debris and other non-magnetic materials. Some magnetic field sensors are based upon the magnetoresistive effect in which a material has a tendency to change the value of its electrical resistance in response to an externally-applied magnetic field. Magnetoresistive devices include, for example, Anisotropic Magneto Resistance (AMR) technology, Giant Magneto Resistance (GMR), Tunnel Magneto Resistance (TMR), and so forth.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

DETAILED DESCRIPTION

In overview, the present disclosure concerns systems and methodology for measuring angular rotation of an object. More particularly, systems include an assembly of magnetic field sensors located in the vicinity of a polarized object (e.g., a magnet) whose angular rotation can be accurately measured by combining the outputs of the magnetic field sensors. A measurement range of 360° may be obtained by using a multiple pole magnet having a defined asymmetric magnetization configuration. This asymmetric magnetization configuration of the magnet can be produced via an asymmetric physical characteristic, nonuniform magnetization strengths, nonuniform magnetization distributions, off-centered rotation of the magnet, and so forth. The asymmetric magnetization configuration of the magnet introduces a distinct feature in the magnetic field (i.e., a disturbed magnetic field) produced by the magnet and sensed by a magnetic field sensor. Depending upon the defined asymmetric magnetization configuration of the magnet, a rotation dependent effect on the magnetic field can be created, thus yielding a unique profile over a full 360° rotation of the magnet. The 360° angular information can be determined from the disturbed magnetic field by evaluation of the signal characteristics (e.g., signal harmonics).

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It should be understood that the use of relational terms, if any, such as first and second, top and bottom, and the like are used solely to distinguish one from another entity or action without necessarily requiring or implying any actual such relationship or order between such entities or actions. Furthermore, some of the figures may be illustrated using various shading and/or hatching to distinguish the different elements produced within the various structural layers. These different elements within the structural layers may be produced utilizing current and upcoming microfabrication techniques of depositing, patterning, etching, and so forth. Accordingly, although different shading and/or hatching may be utilized in the illustrations, the different elements within the structural layers may be formed out of the same material.

Figure 1:
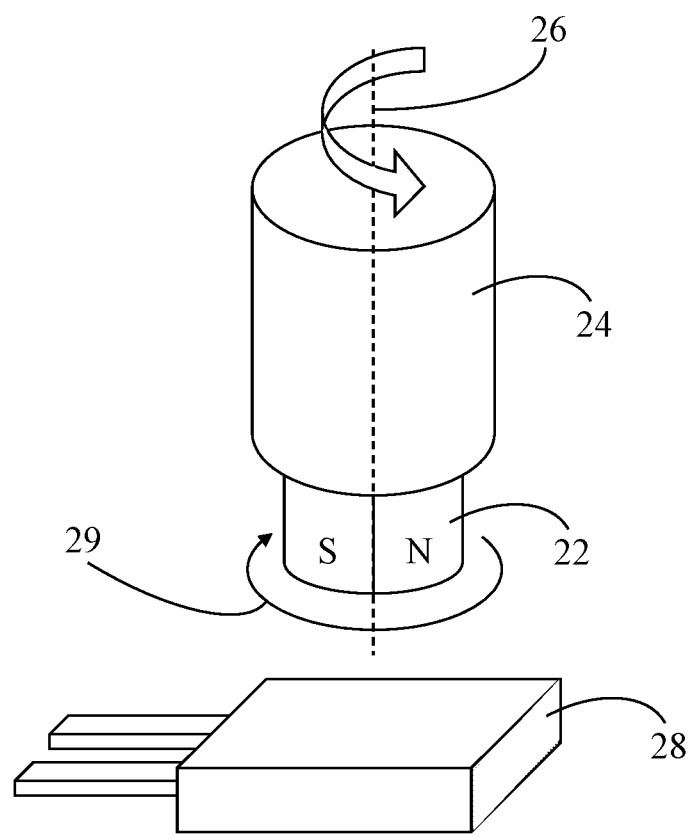
FIG. 1 shows in a simplified and representative form an example of a system for angular position measurement.

Referring to FIG. 1, FIG. 1 shows, in a simplified and representative form, an example of a system 20 for angular position measurement. In this example, a permanent magnet 22 is mounted onto a rotating element, such as a shaft 24, that is configured to rotate about an axis of rotation 26. Shaft 24 may be implemented as a component of a motor (not shown). A packaged magnetic field sensor 28 may be located in proximity to magnet 22. In general, as shaft 24 rotates, a rotating magnetic field 29 of magnet 22 correlates with the angular position of shaft 24, and thus of the motor. Magnetic field sensor 28 is configured to measure the direction of rotating magnetic field 29 of magnet 22 so that the angular position of shaft 24 may be determined.

Figure 2:
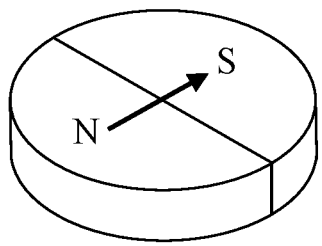
FIG. 2 shows a perspective view of a prior art two-pole magnet that may be implemented within the system of FIG. 1.
Figure 3:
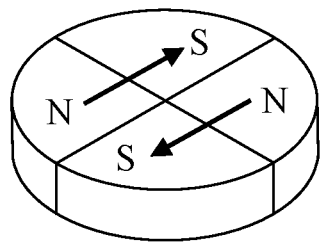
FIG. 3 shows a perspective view of a prior art four-pole magnet that may be implemented within the system of FIG. 1.
Figure 4:
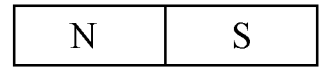
FIG. 4 shows a side view of the four-pole magnet of FIG. 3.
Figure 5:
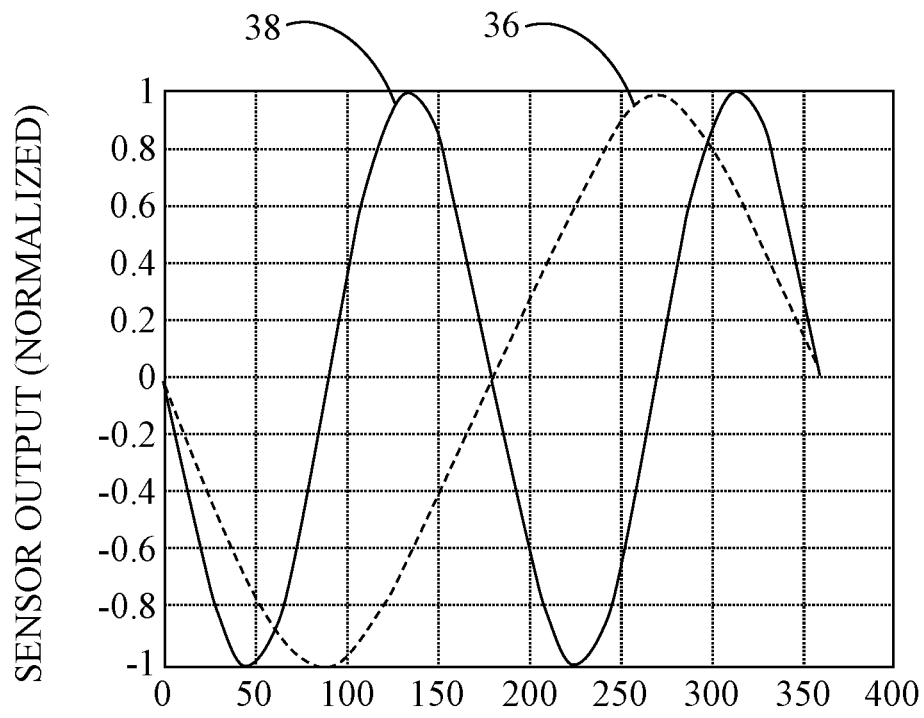
FIG. 5 shows a graph of normalized sensor output signals for a 360° rotation of the two-pole and four-pole magnets of FIGS. 2-3.

Referring now to FIGS. 2-5, FIG. 2 shows a perspective view of a prior art two-pole magnet 30 that may be implemented within system 20 (FIG. 1). FIG. 3 shows a perspective view of a prior art four-pole magnet 32 that may be implemented within system 20. FIG. 4 shows a side view of the four-pole magnet of FIG. 3, and FIG. 5 shows a graph 34 of normalized sensor output signals 36, 38 for a 360° rotation of two-pole and four-pole magnets 30, 32 (FIGS. 2-3), respectively. In FIGS. 2 and 3, black arrows indicate magnetic field vectors. As shown in graph 34, a single period behavior of sensor output signal 36 is observed over a full 360° rotation for two-pole magnet 30, whereas a doubled period behavior of sensor output signal 38 can be observed over a full 360° rotation for four-pole magnet 32.

Magnet shapes that are typically implemented in angular position measurement systems, such as system 20, are disc, block, or ring magnets with a multiple pole configuration. For example, the diametric two-pole magnetization of magnet 30 or the four-pole in-plane magnetization of magnet 32 may be utilized for magnet 22 (FIG. 1) of system 20. Standard two-pole magnet configurations (e.g., magnet 30) are generally utilized and enable an angular detection range of 0-360° rotation angle with giant magnetoresistive (GMR), tunnel magnetoresistive (TMR), or Hall sensors. Additionally, standard two-pole magnet configurations (e.g., magnet 30) enable an angular detection range of 0-180° rotation angle with anisotropic magnetoresistive (AMR) sensors.

Figure 6:
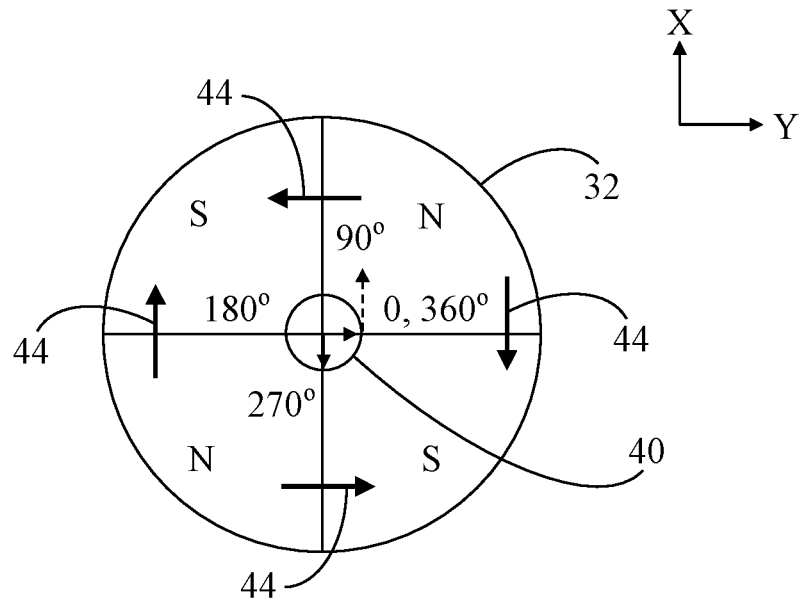
FIG. 6 shows a top view of a rotation path for a four-pole magnet.
Figure 7:
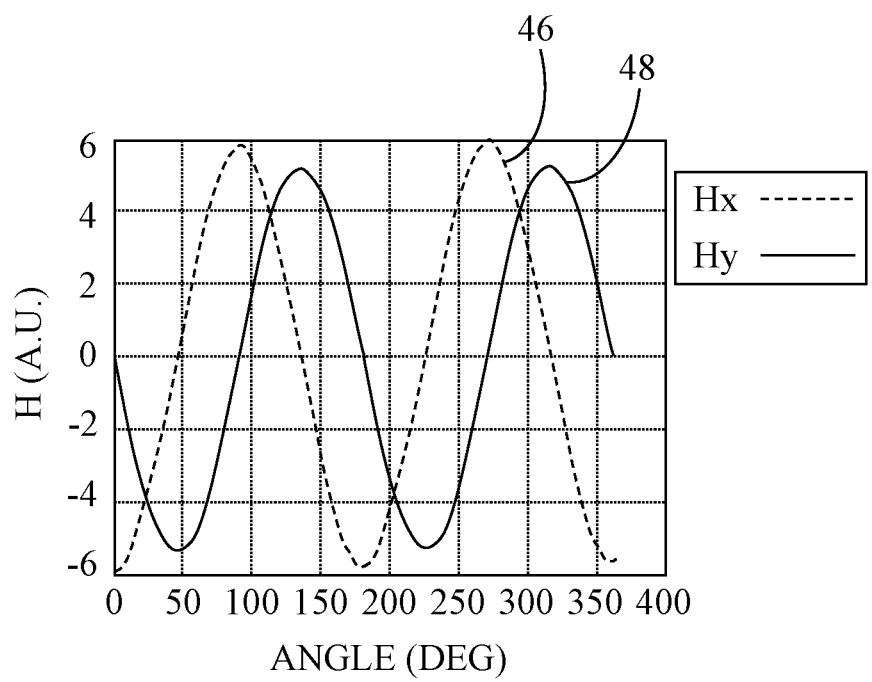
FIG. 7 shows a graph of magnetic field components for the four-pole magnet of FIG. 3.

With reference to FIGS. 6 and 7, FIG. 6 shows a top view of a rotation path 40 for a disc magnet (e.g., four-pole magnet 32) and FIG. 7 shows a graph 42 of magnetic field components for four-pole magnet 32 (FIG. 3). In the example shown in FIG. 6, rotation path 40 is counterclockwise and angular position markings, 0, 90°, 180°, 270°, and 360° are provided for orientation. Arrows 44 indicate the magnetic field direction at the quadrant interface regions of magnet 32. In the example shown in FIG. 7, graph 42 includes an Hx magnetic field component 46 and an Hy magnetic field component 48 of a magnetic field (e.g., magnetic field 29 of FIG. 1) produced by the rotation symmetric geometry of four-pole magnet 32. Thus, each of Hx magnetic field component 46 and Hy magnetic field component 48 have generally symmetric curve characteristics in which the second period of the curve is generally identical to the first period of the curve. In graph 42, Hx magnetic field component 46 and Hy magnetic field component 48 are shown in arbitrary units (A.U.) for simplicity.

For some applications, using magnets with three or more poles may be useful (for example, for stray magnetic field cancellation). Unfortunately, 360° and 180° rotation angle, detection capability is lost for the above mentioned magnetic sensor types (GMR, TMR, or Hall and AMR, respectively) when a magnet having more than two poles is incorporated into an angular position measurement system. That is, a higher number of uniformly distributed poles (e.g., such as four-pole magnet 32) reduces the angle detection range proportionally. In accordance with some embodiments, an asymmetry in the magnetization of a magnet having more than two poles is implemented to introduce a distinct feature in the magnetic field produced by the magnet. That is, the symmetric curve characteristics presented in graph 42 resulting from a magnet (e.g., four-pole magnet 32) having rotation symmetric geometry can be disturbed so as to introduce known asymmetric curve characteristics. With this distinct feature resulting from an asymmetric magnetization configuration of the magnet, an angular position measurement system can detect a rotation angle within an angular detection range of 0-360°. Furthermore, evaluation improvement may be achieved by extracting the rotation angle information from the phase of the harmonics utilizing a Fast Fourier Transform (FFT) technique, as will be discussed below.

Figure 8:
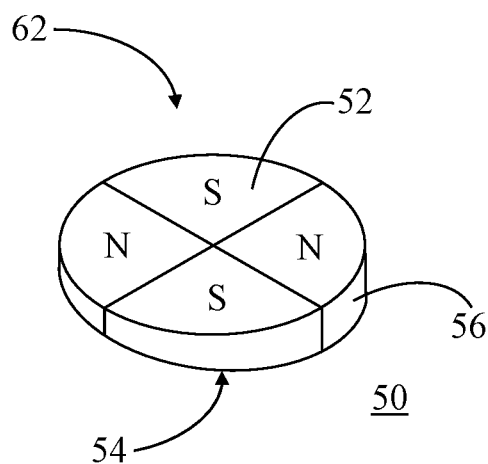
FIG. 8 shows a perspective view of a four-pole magnet that may be implemented within an angular position measurement system in accordance with an embodiment.
Figure 9:
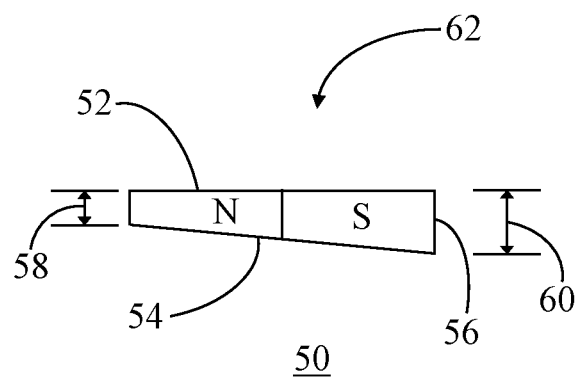
FIG. 9 shows a side view of the four-pole magnet of FIG. 8.

Referring now to FIGS. 8-9, FIG. 8 shows a perspective view of a four-pole magnet 50 that may be implemented within an angular position measurement system in accordance with an embodiment and FIG. 9 shows a side view of four-pole magnet 50. Four-pole magnet 50 includes an asymmetric physical characteristic that produces an asymmetric magnetization configuration of magnet 50. The asymmetric magnetization configuration of magnet 50, in turn creates a distinct feature in the magnetic field produced by magnet 50.

In this example, four-pole magnet 50 includes a first surface 52, a second surface 54, and a side wall 56 extending between first and second surfaces 52, 54 and defining a thickness of magnet 50. First surface 52 is non-parallel with second surface 54 such that the thickness of magnet 50 is continuously variable from a first thickness 58 to a second thickness 60 that is greater than first thickness 58. Thus, the asymmetric physical characteristic of magnet 50 is a wedge-shaped structure 62.

Figure 10:
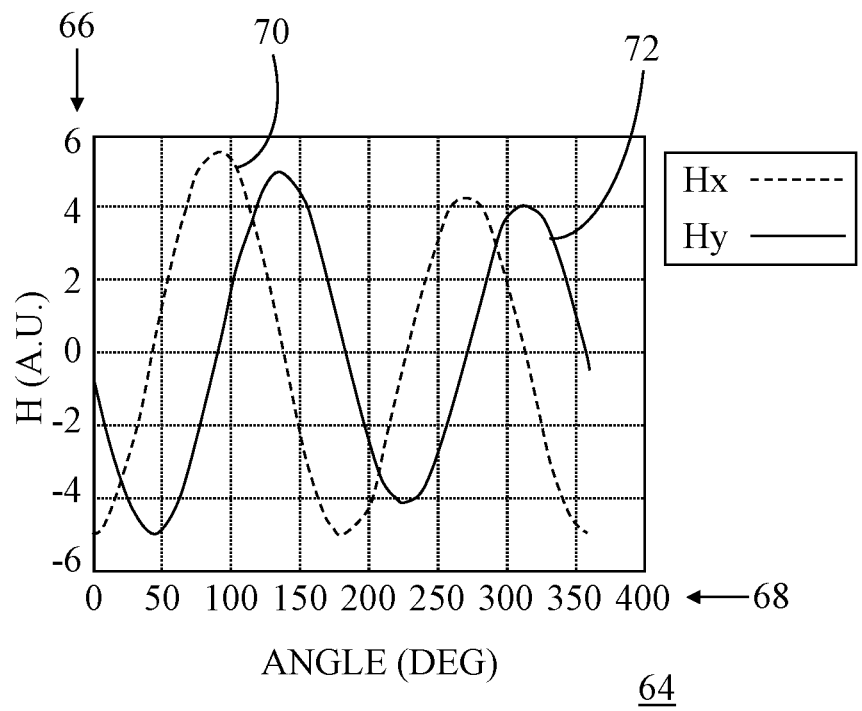
FIG. 10 shows a graph of magnetic field components for the four-pole magnet of FIGS. 8-9.

FIG. 10 shows a graph 64 of magnetic field components for four-pole magnet 50 (FIGS. 8-9). The vertical axis shows the field strength 66, H, in arbitrary units (A.U) relative to input angle 68 in degrees along the horizontal axis of graph 64. Graph 64 includes an Hx magnetic field component 70 and an Hy magnetic field component 72 of a magnetic field produced by the rotation asymmetric geometry of four-pole magnet 50. The asymmetric physical characteristic (e.g., wedge-shaped structure 62) of magnet 50 leads to an asymmetric magnetization configuration of magnet 50 which commensurately produces a distinct feature in the magnetic field (e.g., magnetic field 29 of FIG. 1) surrounding magnet 50, that can be detected by packaged magnetic field sensor 28 (FIG. 1).

This "distinct feature" is particularly exemplified by the asymmetric curve characteristics of Hy magnetic field component 72 as compared to the symmetric curve characteristics of Hy magnetic field component 48 shown in FIG. 7. As compared to Hy magnetic field component 48, Hy magnetic field component 72 resulting from four-pole magnet 50 possesses a strong low (i.e., first) harmonic. From the phase of this first harmonic, the correct 180° range of the rotation angle can be determined.

Figure 11:
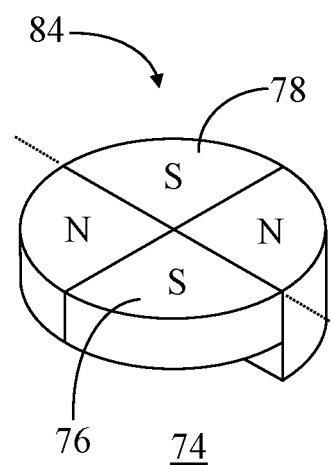
FIG. 11 shows a perspective view of a four-pole magnet that may be implemented within an angular position measurement system in accordance with another embodiment.
Figure 12:
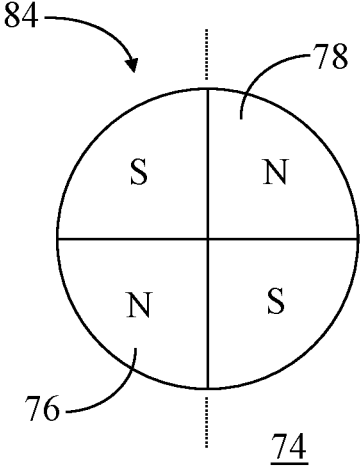
FIG. 12 shows a top view of the four-pole magnet of FIG. 11.
Figure 13:
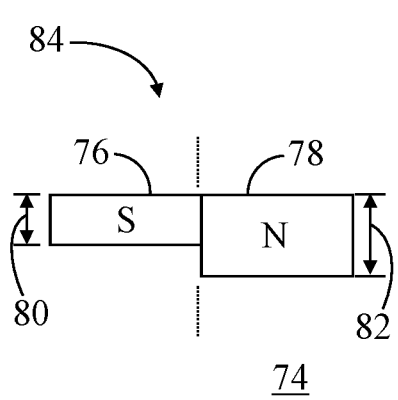
FIG. 13 shows a side view of the four-pole magnet of FIG. 11.

Referring now to FIGS. 11-13, FIG. 11 shows a perspective view of a four-pole magnet 74 that may be implemented within an angular position measurement system in accordance with another embodiment. FIG. 12 shows a top view of four-pole magnet 74 and FIG. 13 shows a side view of four-pole magnet 74. Four-pole magnet 74 includes an asymmetric physical characteristic that again produces an asymmetric magnetization configuration of magnet 74. The asymmetric magnetization configuration of magnet 74, in turn creates a distinct feature in the magnetic field produced by magnet 74.

In this example, four-pole magnet 74 includes a first half section 76 and a second half section 78. Four-pole magnet 74 may be produced by, for example, sintering the material into a specialized shape. In this instance, first half section 76 has a first thickness 80 and second half section 78 has a second thickness 82 that is greater than first thickness 80. Thus, the asymmetric physical characteristic of magnet 74 is a step-like structure 84 that produces the asymmetric magnetization configuration of magnet 74 and, commensurately, the distinct feature in the magnetic field of magnet 74 which can be detected by a magnetic field sensor.

Figure 14:
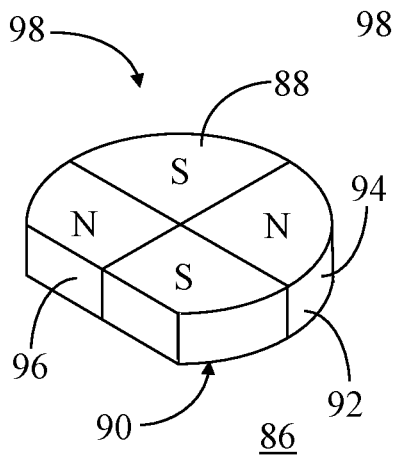
FIG. 14 shows a perspective view of a four-pole magnet that may be implemented within an angular position measurement system in accordance with another embodiment.
Figure 15:
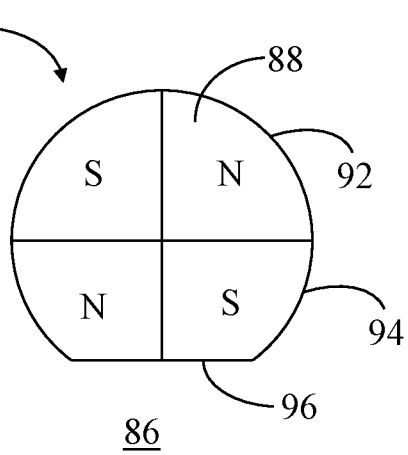
FIG. 15 shows a top view of the four-pole magnet of FIG. 14.
Figure 16:
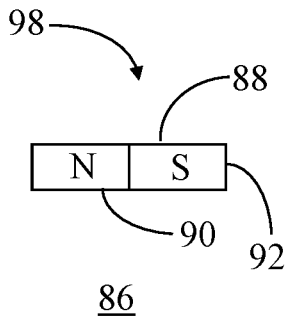
FIG. 16 shows a side view of the four-pole magnet of FIG. 14.

With reference to FIGS. 14-16, FIG. 14 shows a perspective view of a four-pole magnet 86 that may be implemented within an angular position measurement system in accordance with another embodiment. FIG. 15 shows a top view of four-pole magnet 86 and FIG. 16 shows a side view of four-pole magnet 86. Again, four-pole magnet 86 has an asymmetric physical characteristic that produces the asymmetric magnetization configuration of magnet 86. In this example, four-pole magnet 86 includes a first surface 88, a second surface 90, and a sidewall 92 extending between first and second surfaces 88, 90. Sidewall 92 includes a curved surface portion 94 interconnected with a flat surface portion 96. Thus, the asymmetric physical characteristic of magnet 86 is a flat-sided structure 98. In other embodiments, the flat-sided structure 98 may exhibit different shapes, e.g., a rounded or triangular edge shape. Additionally, alternative embodiments may include a bulged structure in which the magnetized material of the magnet extends beyond the circumference of the generally cylindrically shaped magnet.

Figure 17:
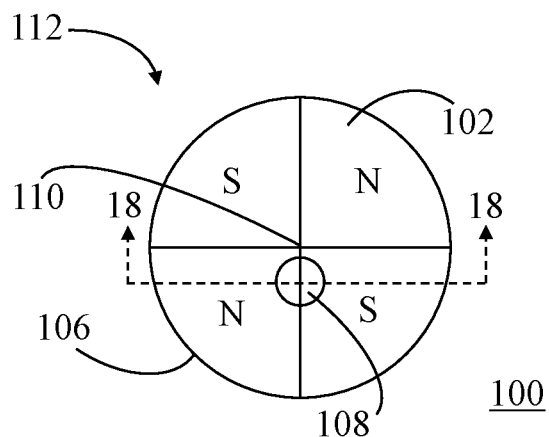
FIG. 17 shows a top view of a four-pole magnet that may be implemented within an angular position measurement system in accordance with another embodiment.
Figure 18:
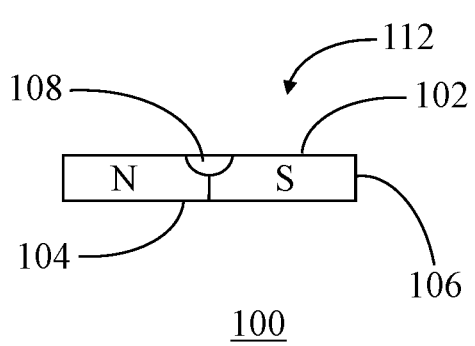
FIG. 18 shows a side view of the four-pole magnet along section lines 18-18 of FIG. 17.

Referring to FIGS. 17-18, FIG. 17 shows a top view of a four-pole magnet 100 that may be implemented within an angular position measurement system in accordance with another embodiment and FIG. 18 shows a side view of four-pole magnet 100 along section lines 18-18 of FIG. 17. Again, four-pole magnet 100 has an asymmetric physical characteristic that produces an asymmetric magnetization configuration of magnet 100. In this example, four-pole magnet 100 includes a first surface 102, a second surface 104, and a sidewall 106 extending between first and second surfaces 102, 104. An aperture 108 extends partially through magnet 100 from first surface 102 toward second surface 104. Additionally, aperture 108 is off-centered relative to a center point 110 of first and second surfaces 102, 104. That is, aperture 108 is displaced away from center point 110. Thus, the asymmetric physical characteristic of magnet 86 is an off-centered half-sphere aperture structure 112. In the illustrated embodiment, aperture 108 is hemispherical in shape. However, in other embodiments, aperture 108 may exhibit a different shape. Still other embodiments may include a protrusion (e.g., an off-centered half-sphere) extending above one or both of first and second surfaces 102, 104 in lieu of aperture 108.

Figure 19:
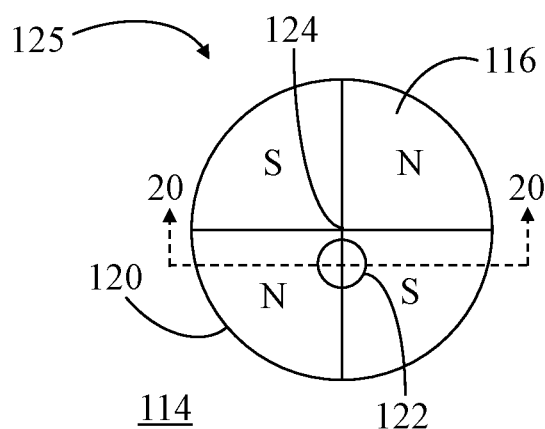
FIG. 19 shows a top view of a four-pole magnet that may be implemented within an angular position measurement system in accordance with another embodiment.
Figure 20:
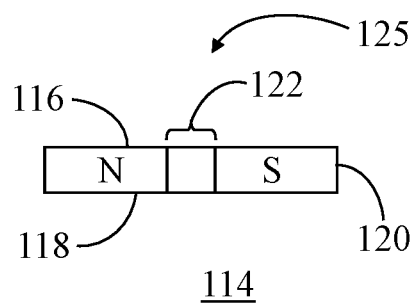
FIG. 20 shows a side view of the four-pole magnet along section lines 20-20 of FIG. 19.

With reference to FIGS. 19-20, FIG. 19 shows a top view of a four-pole magnet 114 that may be implemented within an angular position measurement system in accordance with another embodiment and FIG. 20 shows a side view of four-pole magnet 114 along section lines 20-20 of FIG. 19. Four-pole magnet 114 also has an asymmetric physical characteristic that produces an asymmetric magnetization configuration of magnet 114. In this example, four-pole magnet 114 includes a first surface 116, a second surface 118, and a sidewall 120 extending between first and second surfaces 116, 118. An aperture 122 extends fully through magnet 114 from first surface 116 to second surface 118. Additionally, aperture 122 is off-centered relative to a center point 124 of first and second surfaces 116, 118. That is, aperture 122 is displaced away from center point 124. Thus, the asymmetric physical characteristic of magnet 114 is an off-centered cylindrical through-hole structure 125. In the illustrated embodiment, aperture 122 is cylindrical in shape. However, in other embodiments, aperture 122 may exhibit a different shape.

Figure 21:
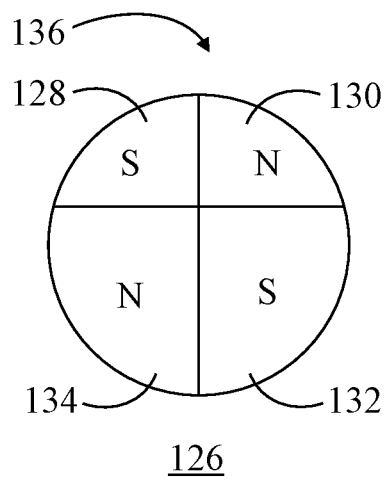
FIG. 21 shows a top view of a four-pole magnet that may be implemented within an angular position measurement system in accordance with another embodiment.

FIG. 21 shows a top view of a four-pole magnet 126 that may be implemented within an angular position measurement system in accordance with another embodiment. Four-pole magnet 126 also has an asymmetric physical characteristic that produces an asymmetric magnetization configuration of magnet 126. In this example, four-pole magnet 126 includes first, second, third, and fourth quadrants 128, 130, 132, 134 respectively, of varying sizes. That is, the sizes of at least some of first, second, third, and fourth quadrants 128, 130, 132, 134 are non-equal. Thus, the asymmetric physical characteristic of magnet 126 is a variable size quadrant structure 136. In the illustrated embodiment, first and second quadrants 128, 130 are generally equivalent in size but smaller than third and fourth quadrants 132, 134. In other embodiments, individual sizes of the various quadrants may differ from those shown.

Figure 22:
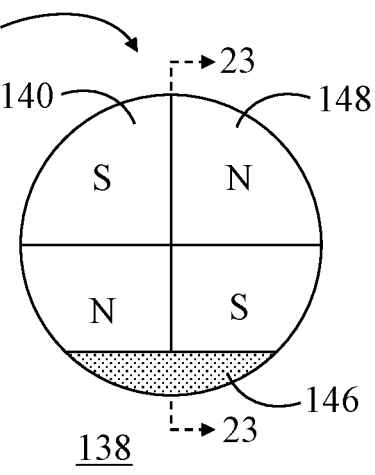
FIG. 22 shows a top view of a four-pole magnet that may be implemented within an angular position measurement system in accordance with another embodiment
Figure 23:
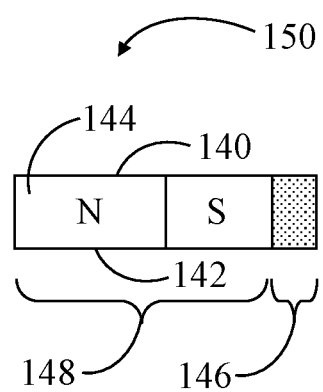
FIG. 23 shows a side view of the four-pole magnet along section lines 23-23 of FIG. 22.

Referring to FIGS. 22-23, FIG. 22 shows a top view of a four-pole magnet 138 that may be implemented within an angular position measurement system in accordance with another embodiment and FIG. 23 shows a side sectional view of four-pole magnet 138 along section lines 23-23 of FIG. 22. In this example, magnet 138 includes a first surface 140, a second surface 142, and a body 144 extending between first and second surfaces 140, 142. A portion 146 (denoted by stippled shading) of body 144 differs in magnetization from a remaining portion 148 of body 144 to produce an asymmetric magnetization configuration of magnet 138. For example, portion 146 may not be magnetized or portion 146 may diverge in magnetization from remaining portion 148 of body 144. Thus, the asymmetric physical characteristic of magnet 138 is a variable magnetization structure 150.

Figure 24:
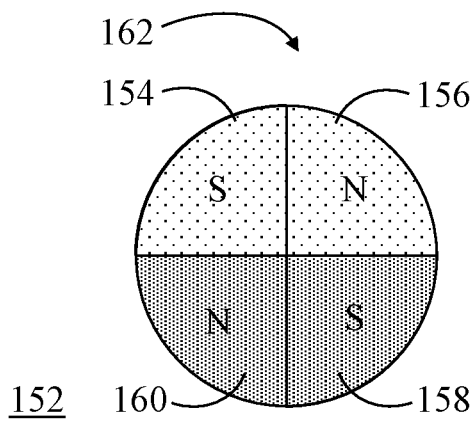
FIG. 24 shows a top view of a four-pole magnet that may be implemented within an angular position measurement system in accordance with another embodiment.

FIG. 24 shows a top view of a four-pole magnet 152 that may be implemented within an angular position measurement system in accordance with another embodiment. In this example, four-pole magnet 152 includes first, second, third, and fourth quadrants 154, 156, 158, 160 respectively. First and second quadrants 154, 156 may have a magnetization (represented by a light stippled pattern) that differs from the magnetization 158, 160 of third and fourth quadrants 158, 160 (represented by a dark stippled pattern). Thus, the asymmetric physical characteristic of magnet 152 is another variable magnetization structure 162.

Figure 25:
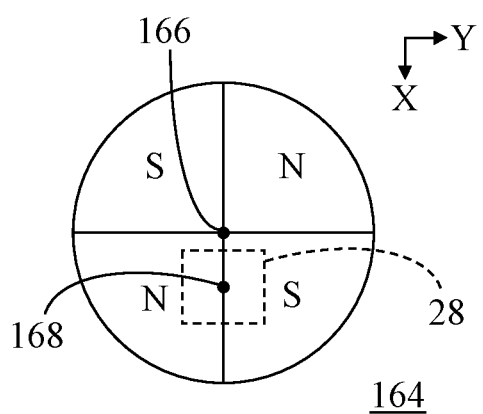
FIG. 25 shows a top view of a four-pole magnet that may be implemented within an angular position measurement system in accordance with another embodiment.

FIG. 25 shows a top view of a four-pole magnet 164 that may be implemented within an angular position measurement system in accordance with another embodiment. In general, four-pole magnet 164 may be a symmetric magnet as described in connection with FIGS. 3-5. Thus, it has a first surface, second surface, and a body extending between the first and second surfaces as shown in FIG. 4. However, in this example, a geometric center point 166 of four-pole magnet 164 is offset relative to axis of rotation 26 (FIG. 1) of rotating shaft 24 (FIG. 1) and therefore has a rotation-angle dependent offset from a center 168 of the magnetic field sensor (e.g., packaged magnetic field sensor 28) to produce the difference between rotation angle range 0-180° and rotation angle range 180-360°. That is, the off-centered positioning of geometric center point 166 of magnet 164 results in the difference between the 0-180° rotation angle range and the 180-360° rotation angle range. In FIG. 25, an X-shifted magnet is shown. However, alternative embodiments may have any of an X-, a Y-, or an X- and Y-shifted magnet.

FIGS. 8, 9, and 11-25 show only a few examples of magnets that have an asymmetric magnetization configuration, in which the asymmetric magnetization configuration produces a distinct feature in the magnetic field produced by the magnet. Further, each example only shows a single asymmetry. It should be understood, however, that a magnet may include some combination of the asymmetries described in the various illustrations. Additionally or alternatively, a magnet may have multiple asymmetries such as multiple flat sides, multiple steps, multiple apertures, multiple bulges, and the like. Further, only disc magnets having four poles are shown herein. However, in alternative embodiments, differing magnet shapes (e.g., rectangular, block, and so forth) may be implemented, with the magnet having at least three poles.

Figure 26:
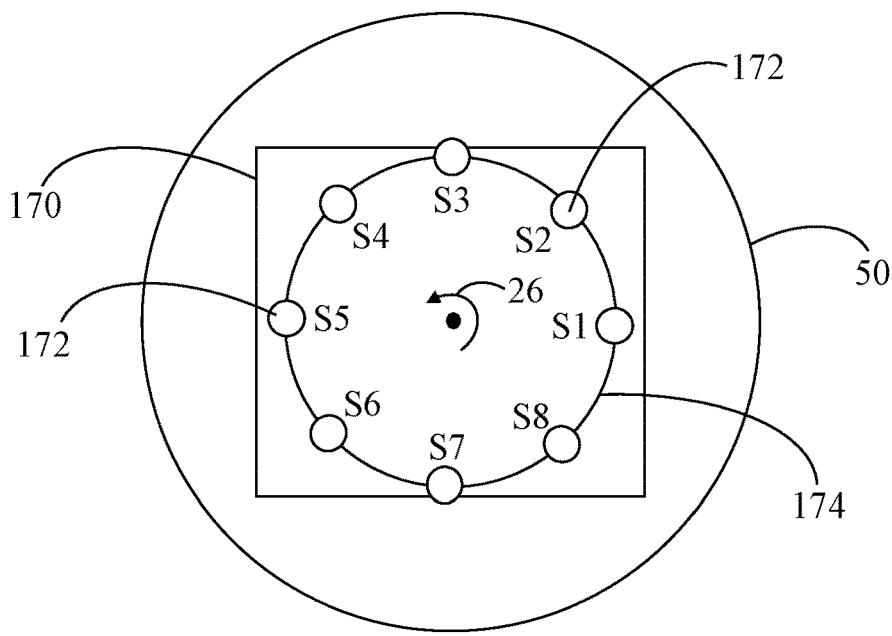
FIG. 26 shows a simplified top view of an application specific integrated circuit (ASIC) that includes a plurality of magnetic field sensors that may be implemented within an angular position measurement system.

FIG. 26 shows a simplified top view of an application specific integrated circuit (ASIC) 170 that includes eight magnetic field sensors 172, labeled S1 through S8 that may be implemented within an angular position measurement system. Magnetic field sensors 172 may be fabricated on, or otherwise integrated with, ASIC 170. Further, ASIC 170 with magnetic field sensors 172 may form at least part of the internal structure of a packaged magnetic field sensor (e.g., packaged magnetic field sensor 28 of FIG. 1). For illustrative purposes, a circular line surrounds ASIC 170 with magnetic field sensors 172. This circular line represents any of the aforementioned magnets having an asymmetric magnetization configuration and more than two poles. By way of example, the circular line represents four-pole magnet 50 described in detail in connection with FIGS. 8-10.

In some embodiments, magnetic field sensors 172 may be magnetoresistive sense elements (e.g., AMR, GMR, TMR and other related technologies). Magnetoresistive sensor technologies have some distinct advantages over Hall sensors. Magnetoresistive sensor technologies may achieve better noise performance than Hall sensors. Additionally, magnetoresistive sensors may be operated reliably at much higher temperatures and at greater operating distances from the magnet relative to Hall effect sensors. Further, it may be possible to achieve higher angular accuracies with magnetoresistive sensors relative to Hall effect sensors. Although magnetoresistive sensors are discussed herein, other embodiments calling for lower resolution may implement Hall sensors along with magnets having an asymmetric magnetization configuration.

Magnetic field sensors 172 are located along a circular path 174 about axis of rotation 26 and are uniformly positioned with a relative rotation angle of 45° with respect to one another. In this example, eight magnetic field sensors 172 are implemented. The eight magnetic field sensors 172 may be useful to avoid aliasing (e.g., distortion) in further processing operations generally discussed below. However, depending at least in part on the magnetic configuration of the encoder magnet other quantities of magnetic field sensors may be beneficial. For simplicity of discussion and continuity in subsequent drawings, the encoder magnet is four-pole magnet 50 having wedge-shaped structure 62 (FIGS. 8-9) that produces the asymmetric magnetization configuration.

Figure 27:
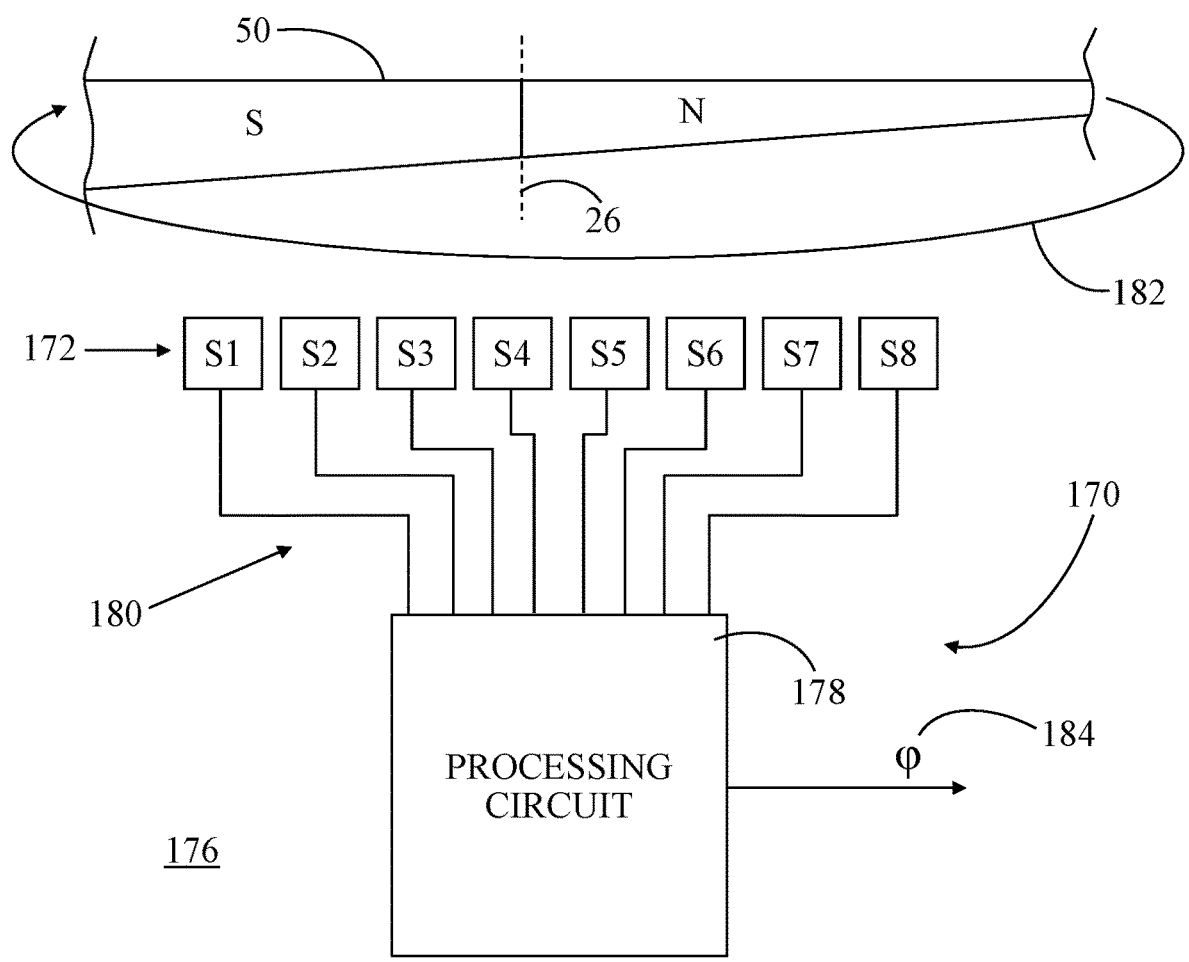
FIG. 27 shows a simplified block diagram of an angular position measurement system.

Referring to FIGS. 26-27, FIG. 27 shows a simplified block diagram of an angular position measurement system 176 that may include an encoder magnet having an asymmetric magnetization configuration. ASIC 170 may implement, among other features, a processing circuit 178 that is customized to function with magnetic field sensors 172. Conductive pathways 180 interconnect each of magnetic field sensors 172 with processing circuit 178. Each of magnetic field sensors 172 is configured to produce an output signal in response to a changing magnetic field 182 produced by four-pole magnet 50 (a portion of which is shown in proximity to magnetic field sensors 172) when magnet 50 rotates about axis of rotation 26. Processing circuit 178 is configured to receive the output signals and suitably combine them to determine a rotation angle, φ, 184 for magnet 50, and hence for a rotating element (e.g., shaft 24 of FIG. 1) to which magnet 50 is coupled. Further, this rotation angle 184 can be in a range of 0-360° as will be discussed below.

Magnetic field sensors 172 are shown in the block diagram as being arranged in a line for simplicity. However, in an actual configuration, magnetic field sensors 172 may be arranged along circular path 174 as shown above. Additionally, those skilled in the art will recognize that processing circuit 178 can encompass a wide variety of processing, control, or other structures. Further, although magnetic field sensors 172 are described herein as being integrated with ASIC 170, in other configurations magnetic field sensors 172 may be packaged separately from an ASIC that includes processing circuit 178. Therefore, in the interest of brevity and minimization of any risk of obscuring the principles and concepts of the various embodiments, further discussion of such structures, if any, will be limited to the essentials with respect to the principles and concepts of the various embodiments.

Figure 28:
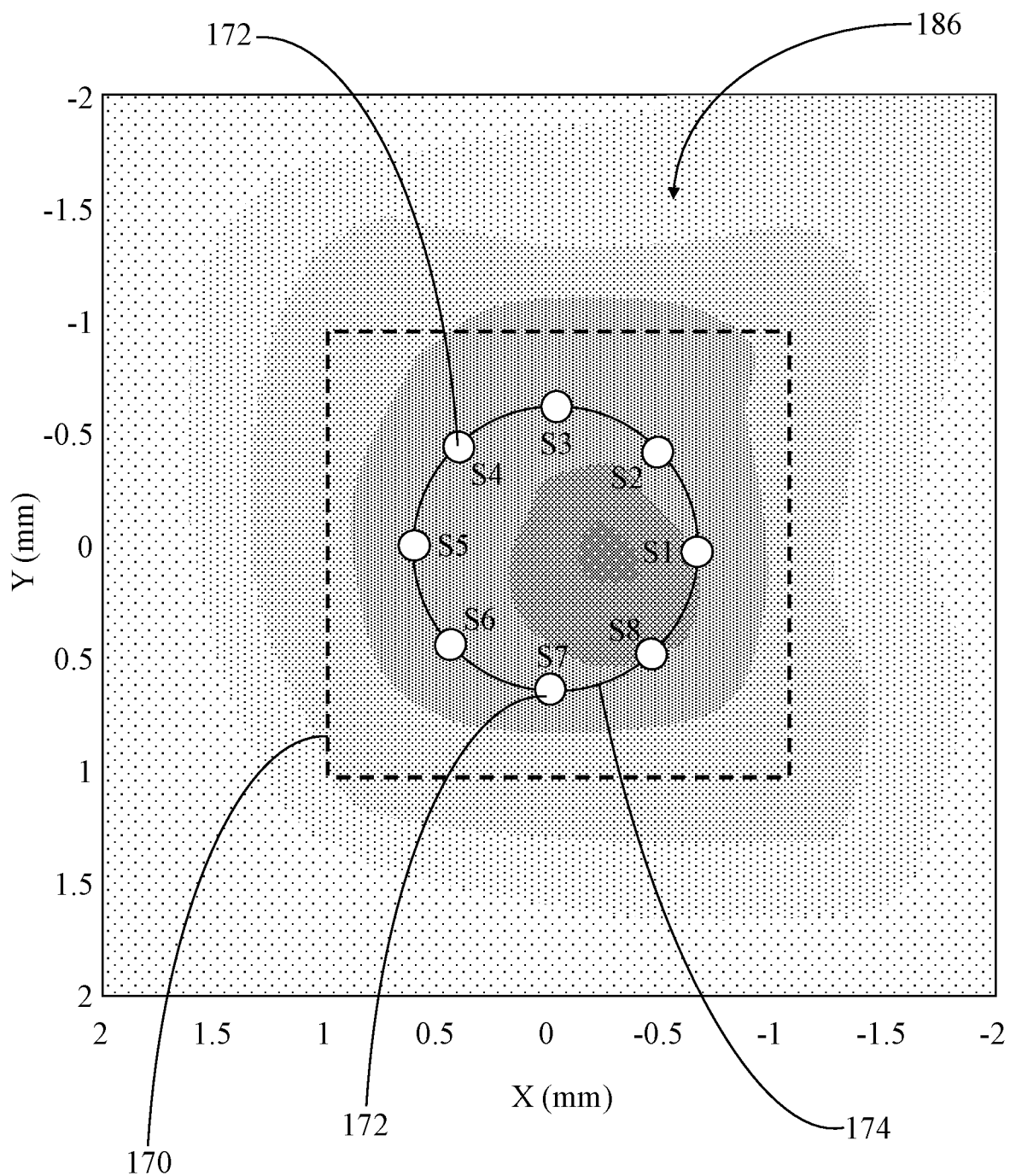
FIG. 28 shows an example of magnetic field magnitudes that may be produced in response to a magnet having an asymmetric magnetization configuration.

FIG. 28 shows an example of magnetic field magnitudes 186 that may be produced in response to a magnet having an asymmetric magnetization configuration. Continuing with the above example, the magnet may be four-pole magnet 50 having wedge shaped structure 62 (FIGS. 8-9). In FIG. 28, magnitudes 186 of the detected magnetic field 182 (FIG. 27) are represented by stippled shading where lighter shading represents smaller values of the magnetic field magnitude and darker shading represents larger values of the magnetic field magnitude. As can be visually observed, the pattern of the varying values of magnitudes 186 is not symmetrical. The asymmetric varying values of magnitudes 186 is representative for the asymmetric magnetization configuration of magnet 50. Accordingly, the magnetic field vectors of magnetic field 182 detectable by magnetic field sensors 172 will vary in response to the asymmetry and are thus indicative of the asymmetric magnetization configuration.

Figure 29:
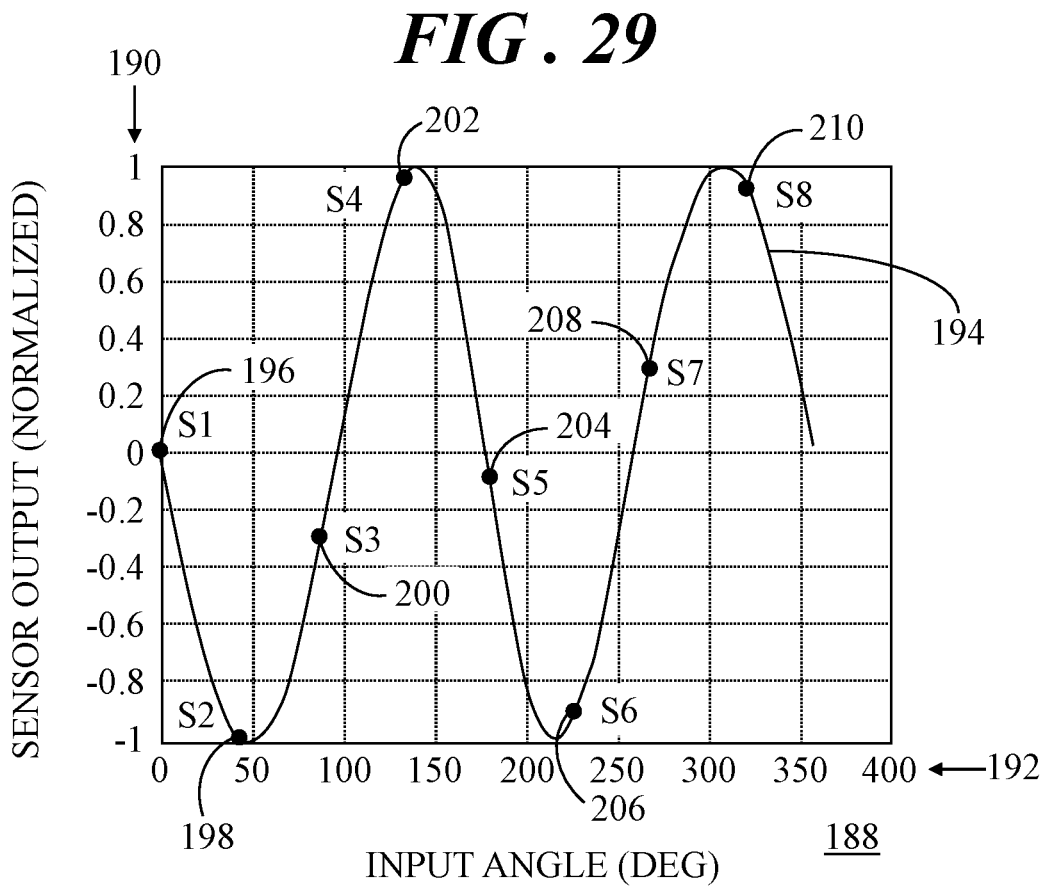
FIG. 29 shows a graph of normalized sensor output signals for a 360° rotation of a magnet having the asymmetric magnetization configuration.

FIG. 29 shows a graph 188 of normalized sensor output signals for a 360° rotation of a magnet (e.g., four-pole magnet) having the asymmetric magnetization configuration. The vertical axis shows normalized sensor output 190 relative to an input rotation angle 192 in degrees along the horizontal axis of graph 188. A solid curve depicts a normalized sensor output signal 194 of a single magnetic field sensor 172 (e.g., S1) for a full rotation of 360°. Normalized sensor output signal 194 may be the ratio of an Hx magnetic field component to an Hy magnetic field component (Hx/Hy) of the magnetic field vectors resulting from magnitudes 186 (FIG. 28) of magnetic field 182 (FIG. 27). Sensor output signal 194 exhibits doubled period behavior due to the four-pole configuration of magnet 50.

As mentioned above, eight magnetic field sensors 172 (S1 through S8) may be used for aliasing (e.g., distortion) free sampling, as long as harmonics above the fourth harmonic are negligible. That is, instead of sampling an output signal eight times from a single sensor per rotation, eight magnetic field sensors 172 are placed on ASIC 170 with an equidistant angular distance from each other. Hence, graph further includes eight data points 196, 198, 200, 202, 204, 206, 208, 210 which correspond with sensor output signals from the eight magnetic field sensors 172 (S1 through S8) at a given instant in time. With a four-pole magnet having a symmetrical magnetization configuration, output signals from opposing sensors along circular path 174 would have an equal magnitude. That is, for a configuration of magnetic field sensors 172 spaced equidistantly, sensor output from S1 would be equivalent to sensor output from S5, sensor output from S2 would be equivalent to sensor output from S6, and so forth. However, due to the asymmetric magnetization configuration of, for example, four-pole magnet 50, it can be observed that data point 196 representing sensor output from S1 is not equivalent to data point 204 representing sensor output from S5, data point 198 representing sensor output from S2 is not equivalent to data point 206 representing sensor output from S6, and so forth.

The asymmetric magnetization configuration of four-pole magnet 50 introduces a distinct feature in the magnetic field distribution as generally represented by magnetic field magnitudes 186 (FIG. 28). Depending upon the particular asymmetry, a rotation dependent effect (for example, the second period is not identical to the first period) on the detected magnetic field can be created. Thus, a unique profile is produced over the full 360° rotation of magnet 50, as exemplified by data points 196, 198, 200, 202, 204, 206, 208, 210.

Figure 30:
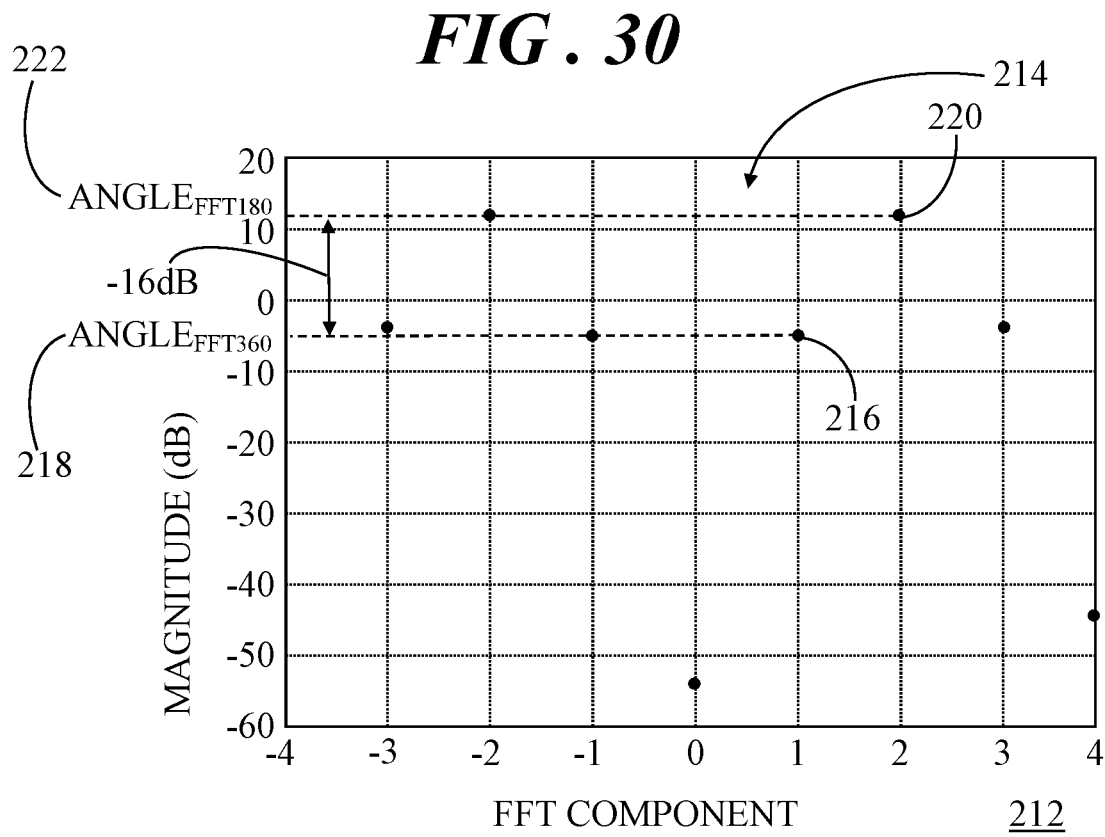
FIG. 30 shows a graph of a Fast Fourier Transform (FFT) determined from the sensor output signals presented in FIG. 29.

Referring to FIG. 30 in connection with FIG. 29, FIG. 30 shows a graph 212 of a Fast Fourier Transform (FFT) 214 determined from the sensor output signals presented in FIG. 29. In some embodiments, angle information may be extracted from the phase of the harmonics by an FFT technique by utilizing the sensor output signals (e.g., data points 196, 198, 200, 202, 204, 206, 208, 210) of the eight magnetic sense elements 172. In this example with eight samples, (i.e., sensor output signals), FFT 214 has eight components. In this representation, ranging from −3 to +4. When no harmonics higher than the 4th harmonic are present in the continuous output versus input angle curve of FIG. 29, component zero (0) determines the average (DC) value of the eight samples, −1 and +1 determine the first harmonic, −2 and +2 determine the second harmonic, and −3 and +3 determine the 3rd harmonic. The fourth component has no fixed relation to the $4^{th}$ harmonic in the continuous output versus input angle curve.

A first harmonic FFT component 216 may thus be estimated from the FFT components 1 and/or −1 and is therefore actually determined from the sensor output signals (e.g., data points 196, 198, 200, 202, 204, 206, 208, 210). First harmonic 216 provides first rotation angle information 218, labeled $ANGLE_{FFT360}$, based on a single rotation of 360°. Thus, first harmonic 216 delivers first rotation angle information 218 for 360°. A second harmonic FFT component 220 can in the same way be estimated from FFT components −2 and/or 2 and is therefore actually also determined from the sensor output signals (e.g., data points 196, 198, 200, 202, 204, 206, 208, 210). Second harmonic 220 provides second rotation angle information 222, labeled $ANGLE_{FFT180}$, based on the periodicity of 180° of rotation. Thus, second harmonic 220 delivers second rotation angle information 222 based on the number of poles of a magnet having more than two poles (e.g., four-pole magnet 50), and hence produces a sensor output signal having more than one period during a full 360° rotation.

Figure 31:
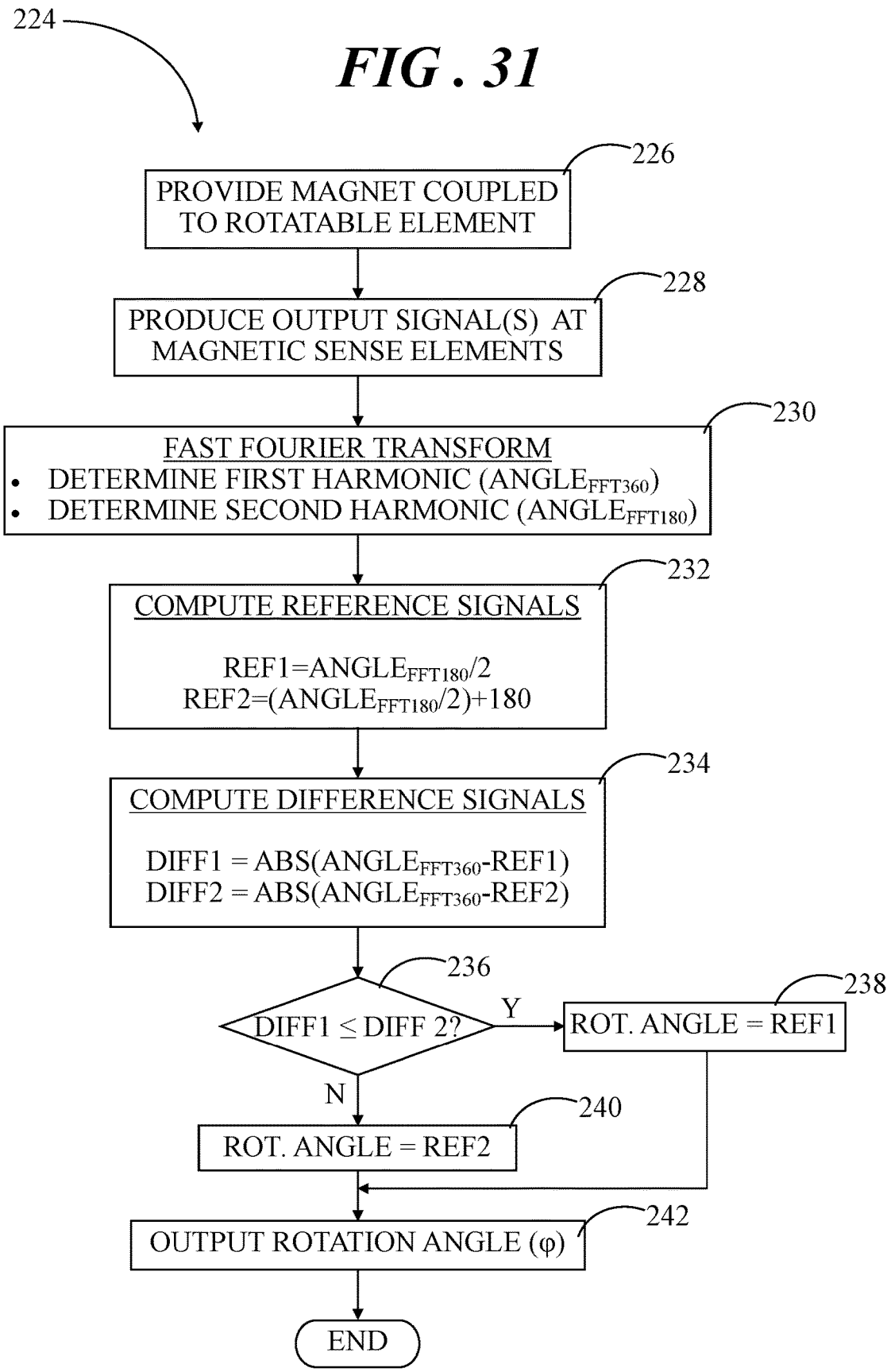
FIG. 31 shows a flowchart of an angular position measurement process in accordance with another embodiment.

Referring to FIGS. 26, 27, and 31, FIG. 31 shows a flowchart of an angular position measurement process 224 in accordance with another embodiment. Angular position measurement process 224 entails methodology for determining a rotation angle of a rotating element that may be performed by angular position measurement system 176 in which a magnet having an asymmetric magnetization configuration is coupled to the rotating element (e.g., shaft 24 of FIG. 1). In particular, process 224 describes the signal processing operations that may be performed by processing circuit 178 to determine rotation angle 184 over a range of 0-360° utilizing first and second rotation angle information 218, 222 (FIG. 30).

At a block 226, a magnet is provided coupled to the rotating element (e.g., shaft 24 of FIG. 1), the magnet and rotating element being configured to rotate about an axis of rotation (e.g., axis of rotation 26 of FIG. 1), and the magnet having an asymmetric magnetization configuration. Continuing the example presented above, the magnet provided in connection with angular position measurement process 224 is four-pole magnet 50. However, any of the aforementioned magnets having an asymmetric magnetization configuration or any variants thereof may be utilized. As discussed above, the magnet is configured to produce a magnetic field 182 and the asymmetric magnetization configuration produces a distinct feature in the magnetic field.

At a block 228, sensor output signals are produced at magnetic sense elements 172. Referring briefly to FIG. 29, a first magnetic field sensor 172, labeled S1, produces a first output signal (e.g., data point 196), a second magnetic field sensor 172, labeled S2, produces a second output signal (e.g., data point 198), a third magnetic field sensor 172, labeled S3, produces a third output signal (e.g., data point 200), a fourth magnetic field sensor 172, labeled S4, produces a fourth output signal (e.g., data point 202), a fifth magnetic field sensor 172, labeled S5, produces a fifth output signal (e.g., data point 204), a sixth magnetic field sensor 172, labeled S6, produces a sixth output signal (e.g., data point 206), a seventh magnetic field sensor 172, labeled S7, produces a seventh output signal (e.g., data point 208), and an eighth magnetic field sensor 172, labeled S8, produces an eighth output signal (e.g., data point 210). The sensor output signals (e.g., data points 196, 198, 200, 202, 204, 206, 208, 210) are indicative of the distinct feature in magnetic field 182 resulting from the asymmetric magnetization configuration of magnet 50. Of course, systems implementing a different number of magnetic field sensors will yield a different number of sensor output signals at a given sampling period.

At a block 230, the sensor output signals (e.g., data points 196, 198, 200, 202, 204, 206, 208, 210) are input to processing circuit 178 via conductive pathways 180 and may be suitably computed by, for example, a Fast Fourier Transform (FFT) algorithm. In general, an FFT algorithm computes the Fourier transform of a set of discrete data values. Given a finite set of data points, the FFT expresses the data in terms of its component frequencies (e.g., harmonics). Referring briefly to FIG. 30, at least first and second harmonics 216 and 220 are determined at block 230 via FFT computation. First harmonic 216 provides first rotation angle information 218, $ANGLE_{FFT360}$, and second harmonic 220 provides second rotation angle information 222, $ANGLE_{FFT180}$.

At a block 232, a first reference signal, REF1, and a second reference signal, REF2, are computed. The first reference signal is computed using second harmonic 220 as a simple division by the factor two (REF1=$ANGLE_{FFT180}$/2). The second reference signal, REF2, is also computed using second harmonic 220 as a simple division by the factor two and additionally a modulo value of 180 ($ANGLE_{FFT180}$/2+180) is added. Thus, the second reference signal, REF2, is shifted relative to the first reference signal, REF1, by the modulo value of 180. Utilizing the four-pole magnet 50 yields two periods of the output signal for a full 360° rotation of magnet 50. In such a configuration, the modulo value is 180. Accordingly, REF1 represents a rotation angle from approximately 0-180° and REF2 represents a rotation angle from approximately 180°-360°. The modulo value will vary in accordance with the number of poles of the implemented magnet. Additionally, the denominator factor in block 232 and the number of reference signals changes in accordance with the number of poles of the implemented magnet.

At a block 234, a first difference signal, DIFF1, and a second difference signal, DIFF2, are computed. The first difference signal is computed using first harmonic 216 and the first reference signal (DIFF1=ABS($ANGLE_{FFT360}$−REF1)). The second difference signal is computed using first harmonic 216 and the second reference signal (DIFF2=ABS($ANGLE_{FFT360}$−REF2)).

At a query block 236, a comparison of the first and second difference signals is made to determine rotation angle, φ, 184 over a range of 0-360°. At query block 236, a determination is made as to whether DIFF1 is less than or equal to DIFF 2. When DIFF1 is less than or equal to DIFF2, process control proceeds to a block 238. At block 238, rotation angle 184 is determined to be REF1. That is, rotation angle 184 is less than or equal to 180°. When DIFF1 is not less than DIFF 2, process control proceeds to a block 240. At block 240, rotation angle 184 is determined to be REF2. That is rotation angle 184 in FIG. 27 is greater than 180°.

Following either of blocks 238 or 240, process 224 continues with a block 242. At block 242, the determined rotation angle 184, (p, is output from processing circuit 178. Thereafter, a single iteration of angular position measurement process 224 ends. Repeated execution of angular position measurement process 224 may be performed in accordance with a provided timing sequence, functional operation of the rotating element, and/or some combination thereof.

Figure 32:
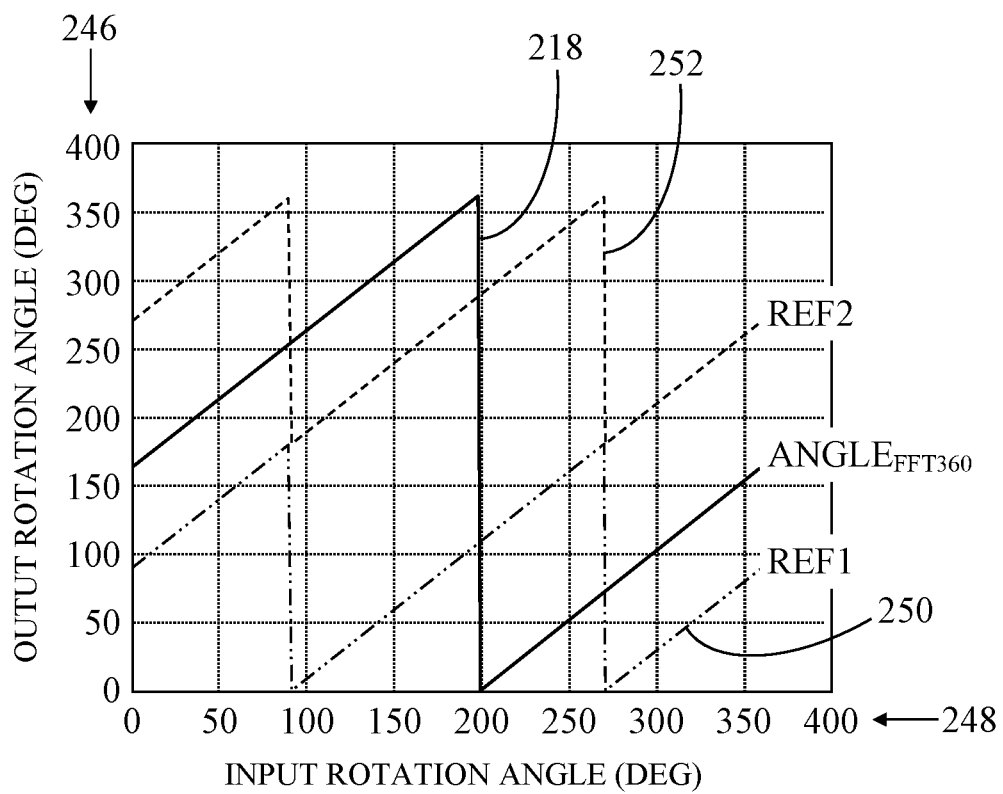
FIG. 32 shows a graph of example output rotation angles plotted against input rotation angles of a magnet having the asymmetric magnetization configuration.

FIG. 32 shows a graph 244 of example output rotation angles 246 plotted against input rotation angles 248 of a magnet having the asymmetric magnetization configuration. In particular, graph 244 shows first rotation angle information 218 ($ANGLE_{FFT360}$), a REF1 curve 250, and a REF2 curve 252 over a full 360° rotation. First rotation angle information 218 represents the calculated angle based on first harmonic 216 (FIG. 30). REF1 curve 250 represents the calculated angle based on second harmonic 220 (FIG. 30), and REF2 curve 252 is generated from REF1 curve 250 by adding the modulo value 180 (i.e., by adding an offset of 180°). The phase of first rotation angle information 218 depends upon the asymmetric magnetization configuration of the particular magnet (e.g., wedge-shaped structure 62 of four-pole magnet 50). Due to the low magnitude of first harmonic 216, the accuracy of first rotation angle information 218 is lower. However, first rotation angle information 218 is only used to determine whether the input rotation angle 192 is between 0-180° or between 180-360°.

To summarize, a sensor output signal of magnetic field sensor 172 will yield two full periods due to the number of poles on the magnet (e.g., a four-pole magnet), thus limiting the angular range to 180°. The outputs (e.g., data points 196, 198, 200, 202, 204, 206, 208, 210) of all eight magnetic field sensors 172 can be combined to obtain a sampled version of the same signal at a given instant in time. When a magnet having a symmetric magnetization configuration is used, the first and second periods are identical. Accordingly, a spectrum plot of signals resulting from a symmetrical magnet will only show a second harmonic. However, when a magnet having an asymmetric magnetization configuration is used in accordance with embodiments described herein, the first and second periods are different. This is visible by observing data points 196, 198, 200, 202, 204, 206, 208, 210 in FIG. 29 and particularly visible in the frequency domain in FIG. 30 by a non-zero first harmonic FFT component 216. A spectrum plot of signals resulting from an asymmetrical magnet will have first harmonic 216 and second harmonic 220. First harmonic 216 can be used to calculate whether the input angle 184 is between 0-180° or between 180-360°. Rotation angle 184 is equal to REF1 if DIFF1 is less than or equal to DIFF2. Otherwise rotation angle 184 is equal to REF2. Accordingly, the overall accuracy of the rotation angle measurement is defined by REF1 and/or REF2.

An FFT approach is generally discussed herein for extraction of 360° angular information from a disturbed magnet field by evaluation of the signal harmonics. However, it should be understood that alternative techniques may be used to extract the angular information, such as the phase of the first harmonic from the combined signal. Alternative techniques may include bandpass filtering, notch filtering, and the like.

Embodiments described herein entail systems and methodology for measuring angular rotation of an object. An embodiment of a system comprises a magnet configured to produce a magnetic field, the magnet having an asymmetric magnetization configuration, the asymmetric magnetization configuration producing a distinct feature in the magnetic field, and a magnetic field sensor configured to produce an output signal in response to the magnetic field, the output signal being indicative of the distinct feature in the magnetic field.

Another embodiment of a system comprises a magnet having an axis of rotation and an asymmetric magnetization configuration, the magnet being configured to produce a magnetic field, wherein the asymmetric magnetization configuration produces a distinct feature in the magnetic field. The system further comprises a first magnetoresistive sensor configured to produce a first output signal in response to the magnetic field, the first output signal being indicative of the distinct feature in the magnetic field, a second magnetoresistive sensor configured to produce a second output signal in response to the magnetic field, the second output signal being indicative of the distinct feature, and a processing circuit configured to receive the first and second output signals and determine a rotation angle for the magnet using the first and second output signals, the rotation angle having a range of 0-360° about the axis of rotation.

An embodiment of a method of determining a rotation angle of a rotating element comprises providing a magnet coupled to the rotating element, the magnet and rotating element being configured to rotate about an axis of rotation, the magnet having an asymmetric magnetization configuration, the magnet being configured to produce a magnetic field, wherein the asymmetric magnetization configuration produces a distinct feature in the magnetic field, producing a first output signal at a first magnetic field sensor in response to the magnetic field, the first output signal being indicative of the distinct feature in the magnetic field, producing a second output signal at a second magnetic field sensor in response to the magnetic field, the second output signal being indicative of the distinct feature in the magnetic field, and determining the rotation angle using the first and second output signals, the rotation angle having a range of 0-360° about the axis of rotation.

Thus, systems include an assembly of magnetic field sensors located in the vicinity of a polarized object (e.g., a magnet) whose angular rotation can be accurately and reliably measured by combining the outputs of the magnetic field sensors. A measurement range of 360° may be obtained by using a multiple pole magnet having a defined asymmetric magnetization configuration. This asymmetric magnetization configuration of the magnet can be produced via an asymmetric physical characteristic, nonuniform magnetization strengths, nonuniform magnetization distributions, off-centered rotation of the magnet, and so forth. The asymmetric magnetization configuration of the magnet or a displaced symmetric magnet introduces a distinct feature in the magnetic field (i.e., a disturbed magnetic field) produced by the magnet and sensed by a magnetic field sensor. Depending upon the defined asymmetric magnetization configuration of the magnet or displacement of the symmetric magnetization configuration, a rotation dependent effect on the magnetic field can be created, thus yielding a unique profile over a full 360° rotation of the magnet. The 360° angular information can be determined from the disturbed magnetic field by evaluation of the signal harmonics.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A system comprising:
a magnet configured to produce a magnetic field, the magnet having an axis of rotation, the magnet having an asymmetric magnetization configuration, the asymmetric magnetization configuration producing a distinct feature in the magnetic field;
a first magnetic field sensor configured to produce a first output signal in response to the magnetic field, the output signal being indicative of the distinct feature in the magnetic field;
a second magnetic field sensor configured to produce a second output signal in response to the magnetic field, the second output signal being indicative of the distinct feature in the magnetic field, the distinct feature being a rotation dependent effect on the magnetic field as the magnet rotates; and
a processing circuit configured to receive the first and second output signals and determine a rotation angle for the magnet using the first and second output signals, the rotation angle having a range of 0-360° about the axis of rotation, wherein the processing circuit is configured to:
determine a first harmonic from the first and second output signals, the first harmonic providing first rotation angle information based on a single rotation of 360° of rotation;
determine a second harmonic from the first and second output signals, the second harmonic providing second rotation angle information based on a periodicity of 180° of rotation;
compute first and second reference signals using the second harmonic, the second reference signal being shifted relative the first reference signal by a modulo value of 180;
compute a first difference signal using the first harmonic and the first reference signal;
compute a second difference signal using the first harmonic and the second reference signal; and
determine the rotation angle over the range of 0-360° based upon a comparison of the first and second difference signals.

2. The system of claim 1 wherein the magnet includes an asymmetrical physical characteristic to produce the asymmetric magnetization configuration of the magnet.

3. The system of claim 2 wherein the magnet comprises:
a first surface;
a second surface; and
a side wall extending between the first and second surfaces, the side wall defining a thickness of the magnet, wherein the first surface is non-parallel with the second surface such that the thickness of the magnet is continuously variable from a first thickness to a second thickness that is greater than the first thickness to produce the asymmetrical physical characteristic.

4. The system of claim 2 wherein the magnet comprises:
a first half section having a first thickness; and
a second half section adjacent to the first half section, the second half section having a second thickness that is greater than the first thickness to produce the asymmetrical physical characteristic.

5. The system of claim 2 wherein the magnet comprises:
a first surface;
a second surface; and
a sidewall extending between the first and second surfaces, the sidewall including a curved surface portion interconnected with a flat surface portion to produce the asymmetrical physical characteristic.

6. The system of claim 2 wherein the magnet comprises:
a first surface;
a second surface; and
a sidewall extending between the first and second surfaces, wherein an aperture extends at least partially through the magnet from the first surface toward the second surface, the aperture being off-centered relative to the first and second surfaces to produce the asymmetrical physical characteristic.

7. The system of claim 1 wherein the magnet comprises a four-pole magnet having first, second, third, and fourth quadrants, wherein sizes of at least some of the first, second, third, and fourth quadrants are non-equal to produce the asymmetric magnetization configuration of the magnet.

8. The system of claim 1 wherein the magnet comprises:
a first surface;
a second surface; and
a body extending between the first and second surfaces, wherein a portion of the body differs in magnetization from a remainder of the body to produce the asymmetric magnetization configuration of the magnet.

9. The system of claim 1 wherein a center point of the magnet is offset relative to an axis of rotation to produce the asymmetric magnetization configuration of the magnet.

10. The system of claim 1 wherein the magnet comprises more than two poles.

11. The system of claim 1 wherein the magnetic sense element comprises a magnetoresistive sensor.

12. A method of determining a rotation angle of a rotating element comprising:
providing a magnet coupled to the rotating element, the magnet and rotating element being configured to rotate about an axis of rotation, the magnet having an asymmetric magnetization configuration, the magnet being configured to produce a magnetic field, wherein the asymmetric magnetization configuration produces a distinct feature in the magnetic field;
producing a first output signal at a first magnetic field sensor in response to the magnetic field, the first output signal being indicative of the distinct feature in the magnetic field;
producing a second output signal at a second magnetic field sensor in response to the magnetic field, the second output signal being indicative of the distinct feature in the magnetic field; and
determining the rotation angle using the first and second output signals, the rotation angle having a range of 0-360° about the axis of rotation, wherein the determining operation comprises:
determining a first harmonic from the first and second output signals, the first harmonic providing first rotation angle information based on a single rotation of 360° of rotation;
determining a second harmonic from the first and second output signals, the second harmonic providing second rotation angle information based on a periodicity of 180° of rotation;
computing first and second reference signals using the second harmonic, the second reference signal being shifted relative the first reference signal by a modulo value of 180;
computing a first difference signal using the first harmonic and the first reference signal;
computing a second difference signal using the first harmonic and the second reference signal; and
determining the rotation angle over the range of 0-360° based upon a comparison of the first and second difference signals.

* * * * *